Jan. 29, 1974 R. H. FRAPPIER ET AL 3,788,920
METHOD OF MAKING ROLLED EDGE SEALED CORRUGATED PAPERBOARD
Original Filed Aug. 21, 1969
7 Sheets-Sheet 4

United States Patent Office 3,788,920
Patented Jan. 29, 1974

3,788,920
METHOD OF MAKING ROLLED EDGE SEALED CORRUGATED PAPERBOARD
Robert H. Frappier, Agawam, Mass., Hal W. Tanner, Jr., Georgetown, S.C., and William O. Wagers, Massillon, Ohio, assignors to International Paper Company, New York, N.Y.
Original application Aug. 21, 1969, Ser. No. 852,038, now Patent No. 3,624,236. Divided and this application July 15, 1971, Ser. No. 162,865
Int. Cl. B31f *1/00;* B32b *3/04, 31/18*
U.S. Cl. 156—202                2 Claims

ABSTRACT OF THE DISCLOSURE

A method for making corrugated core paperboard in which the edges of the facing sheets are rolled inwardly toward each other and tucked into the end of the corrugated core convolutions to form an enclosure therefor; including feeding of the board along a path, slitting the end of the core by cutting or crushing the core along a line intermediate the facing sheets and rolling and tucking the end edges of the facing sheets into the slit, the apparatus including driven belts between which the board is fed along a path, a knife support along the edge of the path through which the edge of the board is fed and dies having edge engaging surfaces for rolling and tucking the ends of the facing sheets into the core.

---

The present application is a division of application Ser. No. 852,038 filed Aug. 21, 1969, entitled "Rolled Edge Sealed Corrugated Paperboard," now U.S. Pat. No. 3,624,236. The present invention relates to a method for making corrugated core paperboard in which one or more of the edges of the corrugated core are closed or sealed by rolling and tucking the facing sheets along such edges.

Corrugated core paperboard, having a corrugated core with facing sheets adhesively secured to the opposite faces thereof, is used for a variety of purposes including packages and containers for many different products. The convolutions of the corrugated core space the facing sheets and, at the opposite edges of the board, form openings or spaces into which dirt, liquid, foreign matter or the material packaged in the container might flow. Such dirt, liquid, foreign matter, or the like, when it flows into the convolution openings, not only detracts from the appearance and sanitary condition of the container but, in many instances, weakens the core and facing sheets and the adhesive bond interconnecting the corrugated core and facing sheets. Because the corrugated core sheet and inner surfaces of the facing sheets are, in most instances, relatively absorbent, the board is especially weakened when the material flowing into the openings or spaces is liquid or a material which will wet the sheets.

Various attempts have, heretofore, been made to close or seal the open, fluted edges of corrugated paperboard. Such attempts, among others, have included the folding of one facing sheet over the open, fluted edge of the corrugated core and adhesively securing such folded facing sheet to the face of the other facing sheet. Other attempts have included the folding of the facing sheets, one over the other, over the open, fluted edge and adhesively securing the folded over edges to each other. Still other attempts have included the extrusion of a U or V-shaped edging of thermoplastic material over the open, fluted board edges. While such attempts have, in varying degrees, eliminated the flow of dirt, liquid, foreign matter, or the like, into the convolution openings, each has required, in one manner or another and in varying degrees, the use of a thermoplastic adhesive or thermoplastic sealing material.

In the instant invention, the open, fluted edge of the corrugated paperboard core is sealed by slitting or crushing the edge of the corrugated core along a line intermediate the facing sheets into the slit or crushed opening in the corrugated core. Thus, the facing sheets whose outer surface may be treated with a liquid-proof or liquid repellent material to withstand wetting by the material to be packaged, are rolled over and into the open, fluted edge and form a closure or seal to prevent the entry of dirt, liquid, foreign material, and the like, into the convolution openings. The corrugated core may be slit or crushed and the edges rolled into the slit or crushed opening so that the rolled edges are maintained in sealing position over the convolution openings without further treatment or, if desired, adhesive may be applied intermediate the rolled edges.

The instant invention includes the method for forming the rolled, closed edge. In the method, the preformed corrugated paperboard, preferably trimmed so that the edge of the core and edge of the facing sheets are square and in alignment, is fed from the corrugation machine, from a roll, or in precut blanks, through the apparatus with the corrugated convolutions transverse to the direction of feed. The corrugated core, at one or both of the open, fluted edges is cut or crushed along the edge, intermediate facing sheets, and the end of the opposite facing sheets are then rolled, one after the other, into the cut or crushed edge. The slitting or crushing of the edge is accomplished with a knife or crushing tool mounted at the edge of the paperboard travel which, as the board passes the knife or tool slits or crushes the core along a line intermediate the facing sheets. The board is then passed through dies or guides which roll the respective ends of the facing sheets and tuck the facing sheet ends into the cut or crushed edge. Where a thermoplastic adhesive is used, the board, with the edge cut and closed by the rolled edges of the facing sheets, is fed through an applicator where a bead of thermoplastic material is applied between the rolled edges of the sheets.

The invention will be more fully understood from the following description and appended drawings in which.

Figures 1, 2, 3:
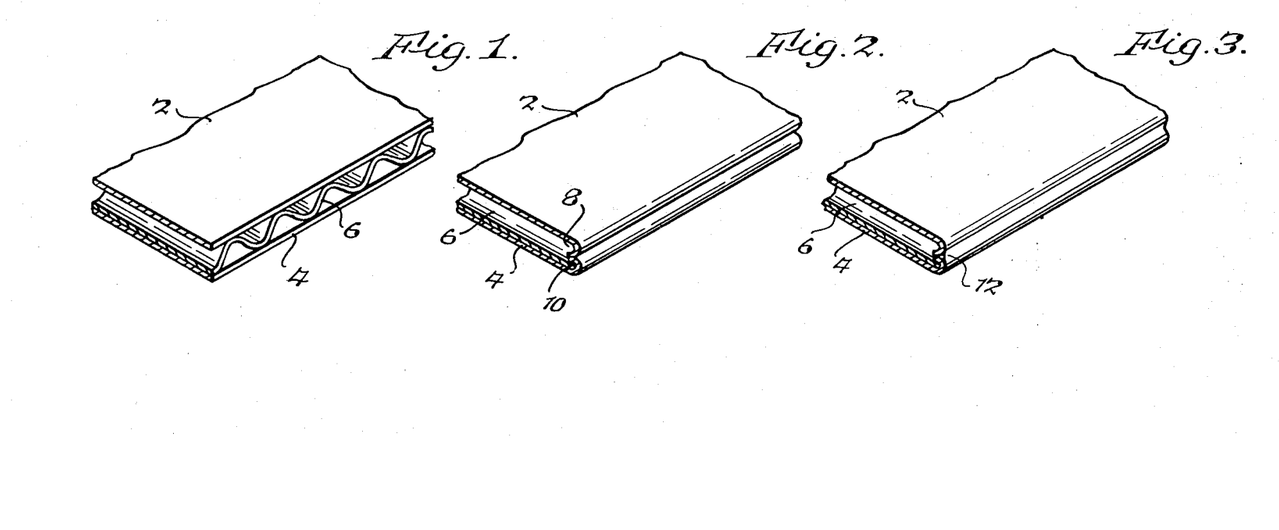
FIG. 1 is a fragmentary perspective view of a corrugated paperboard having an open, untreated fluted edge.
FIG. 2 is a view, similar to FIG. 1, showing the open, fluted edge of the board sealed in accordance with one embodiment of the instant invention.
FIG. 3 is a view similar to FIG. 2 but showing an adhesive bead along the edge of the board intermediate the rolled edges of the facing sheets in accordance with a further embodiment.

Referring to FIGS. 1 to 3, the corrugated core paperboard includes facing sheets 2, 4, adhesively secured to the opposite convolutions of corrugated core 6, in the customary manner, such as on a conventional corrugated paperboard machine. The fluted or open edge, or edges, of the corrugated paper board to be closed are preferably trimmed, if necessary, so that at each edge to be closed, the ends of facing sheets 2, 4 and core 6 are substantially flush and in substantial alignment with each other. The trimmed edge, or edges, are advanced, longitudinally of the edge, first through a knife or crushing tool which slits or crushes the edge of corrugated core 6. The slit or crushed edge is then advanced longitudinally through dies which, as the end of the board comes into contact with the dies, rolls the ends, 8, 10 of the facing sheets 2, 4 and tucks the rolled ends into the slit or crushed line intermediate the sheets. After the facing sheets have been rolled and tucked, if the adhesive bead is to be utilized, the tucked edge of the board is then advanced longitudinally through an applicator which deposits bead 12 of thermoplastic material between the rolled and tucked facing sheets. Either one or both of the open edges may be so sealed.

Referring to FIGS. 4 through 8, and 20 through 24, the apparatus used to practice the method of the instant invention includes a table, generally designated 20, having guides 24, 26. Roller 28 is mounted on arms 30, 32 extending outwardly from one end of table 20. Roller 28 is in substantial alignment with top of table 20. Machine frame, generally designated 34, is attached to the opposite end of table 20 by brackets 36, 38. Supports 40, 42, 44, 46, extend upwardly from the four corners of frame 34.

Figure 4:
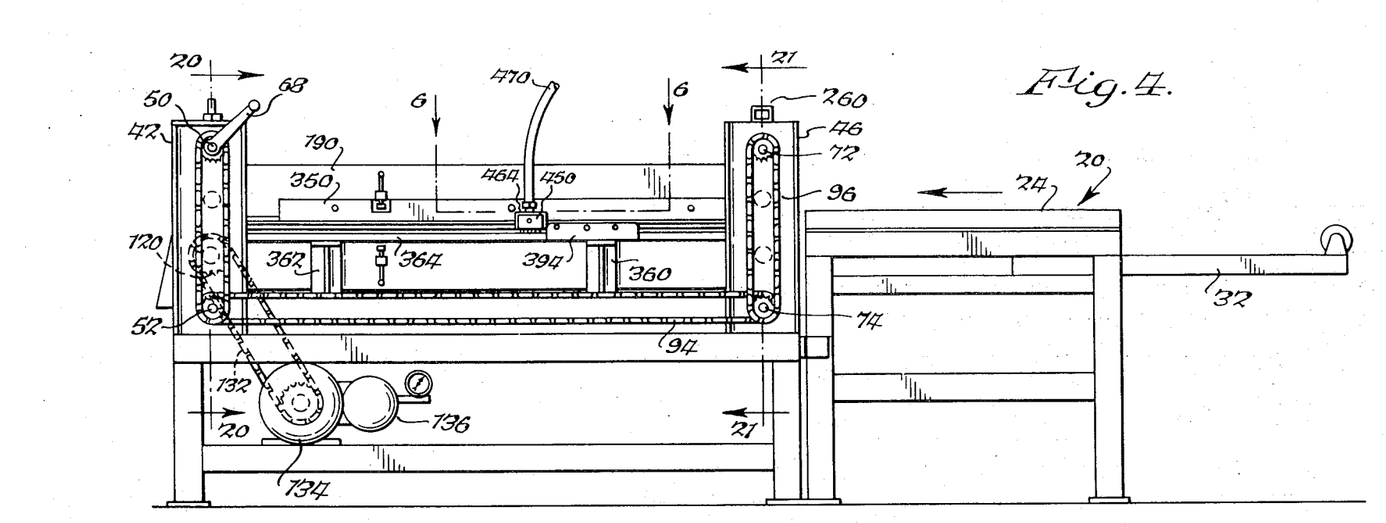
FIG. 4 is a side elevational view of the machine of the instant invention for sealing the edges of corrugated paperboard.
Figure 5:
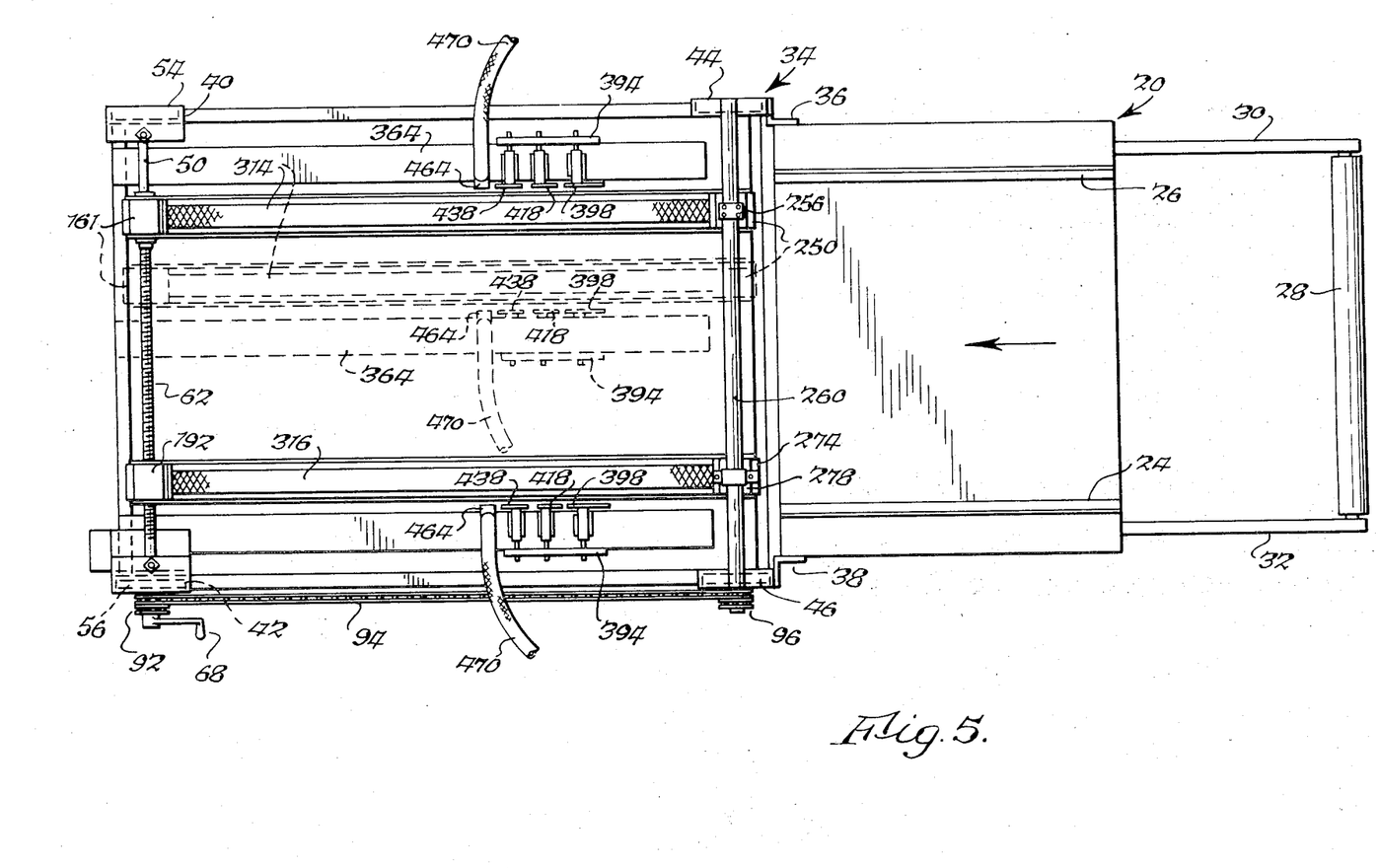
FIG. 5 is a top plan view of the machine of FIG. 4.

Shafts 50, 52 are mounted, at their opposite ends, in bearings 54, 56, 58, 60, fixed to supports 40, 42 and, intermediate their ends, are threaded at 62, 64 (FIG. 20), for purposes hereinafter described. Sprocket 66 and crank handle 68 are keyed to one end of shaft 50 and double sprocket 70 is keyed to the end of shaft 52. Referring to FIGS. 4 and 21, shafts 72, 74 are mounted, at their opposite ends, in bearings 76, 78, 80, 82, fixed to supports 44, 46, respectively, and are threaded, intermediate their ends, at 84, 86, for purposes later described. Sprocket 88 is keyed to shaft 72 and doublt sprocket 90 is keyed to shaft 74. Sprocket 66 is connected to one sprocket of double sprocket 70 by chain 92 (FIGS. 4 and 20) and the other sprocket of double sprocket 70 is connected by chain 94 to one of the sprockets of double sprocket 90. The other sprocket of double sprocket 90, FIG. 21, is connected by chain 96 to sprocket 88. By turning crank 68, shafts 50, 52, 72, 74 are rotated in their respective bearings in supports 40, 42, 44, 46 through the interconnection of chains 92, 94, 96, and sprockets 66, 70, 88, 90 keyed, respectively, to shafts 50, 52, 72, 74.

Figure 20:
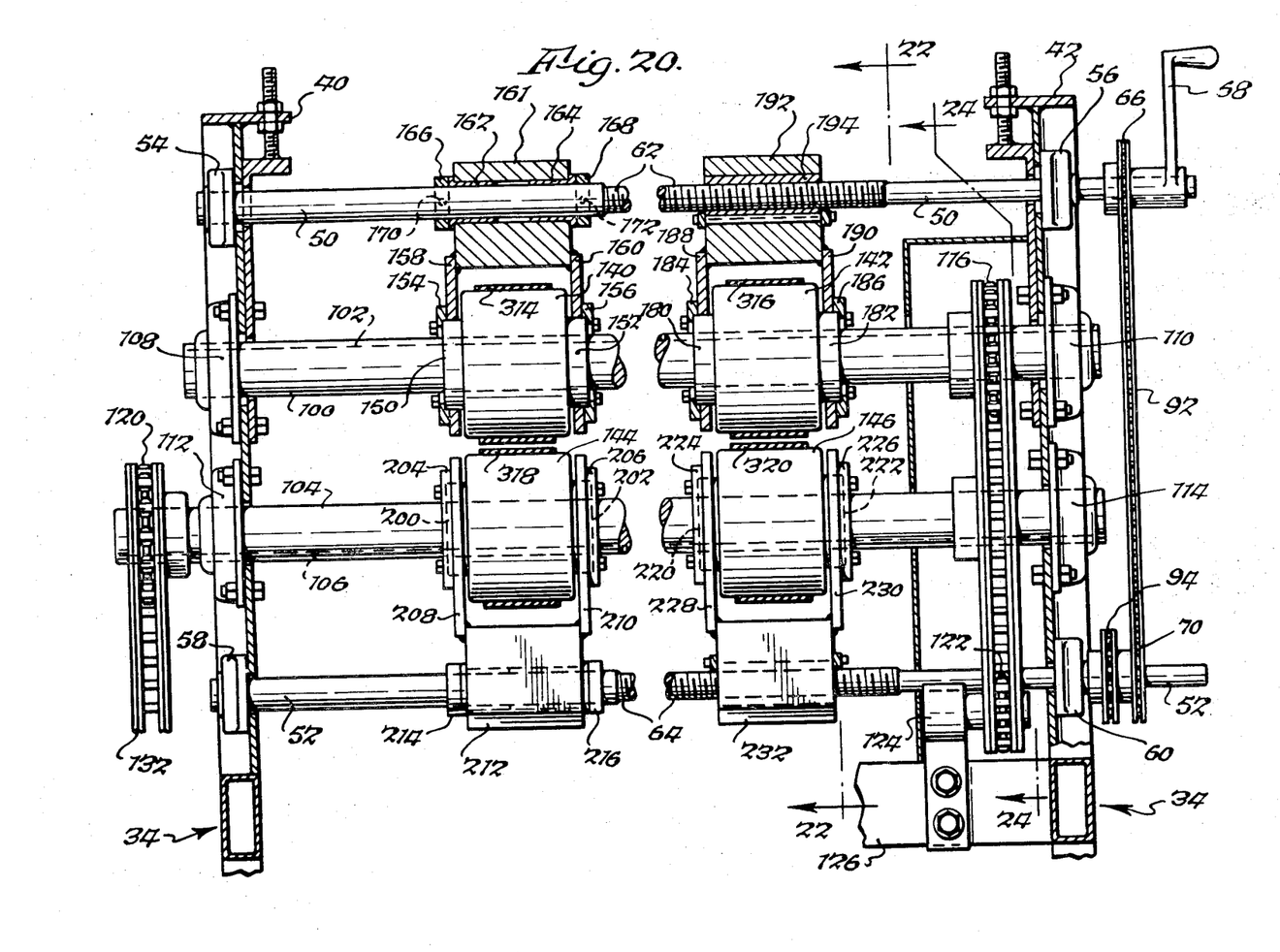
FIG. 20 is a cross-sectional view of the apparatus taken at lines 20—20, FIG. 4.
Figure 21:
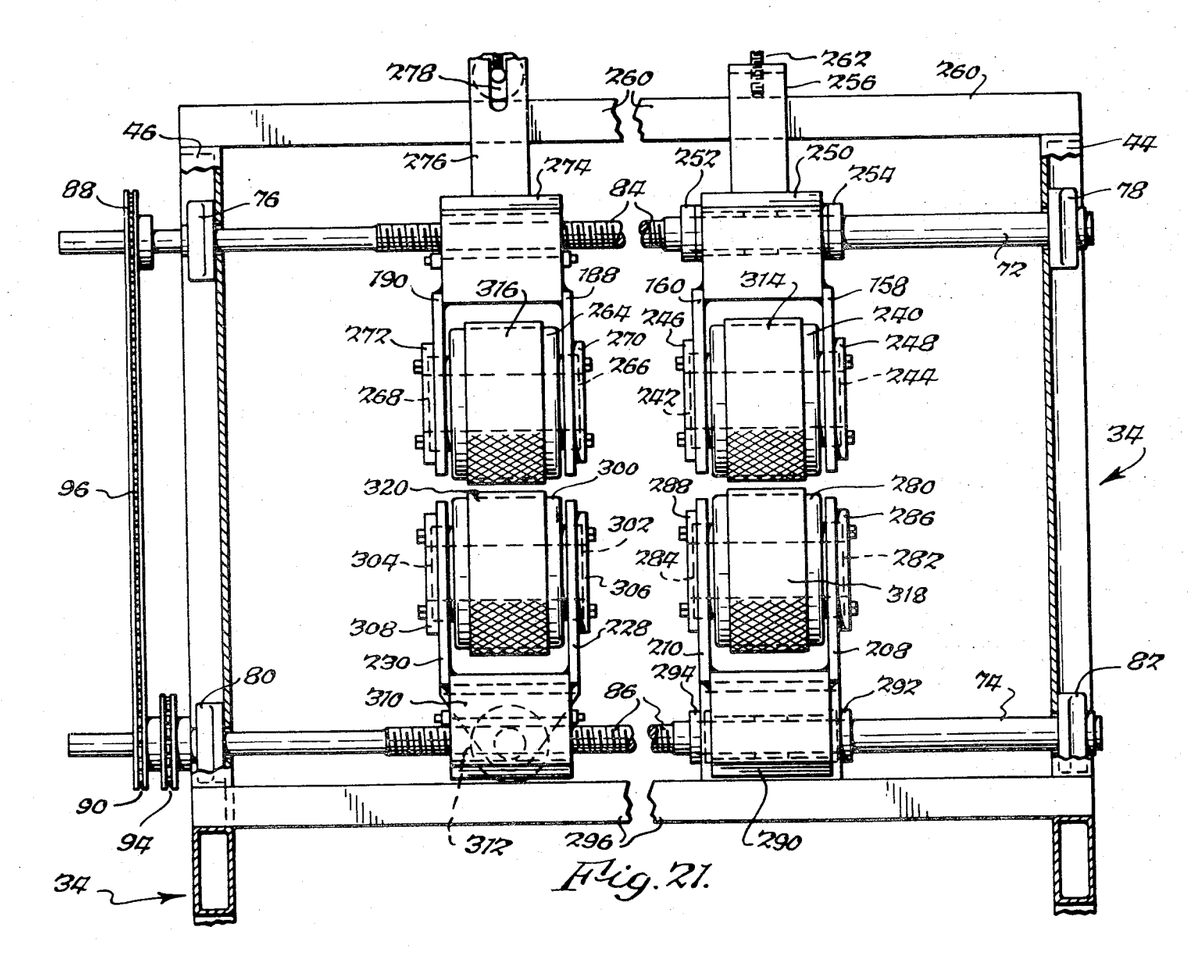
FIG. 21 is a view similar to FIG. 20 but taken at lines 21—21, FIG. 4.
Figures 22, 23, 24:
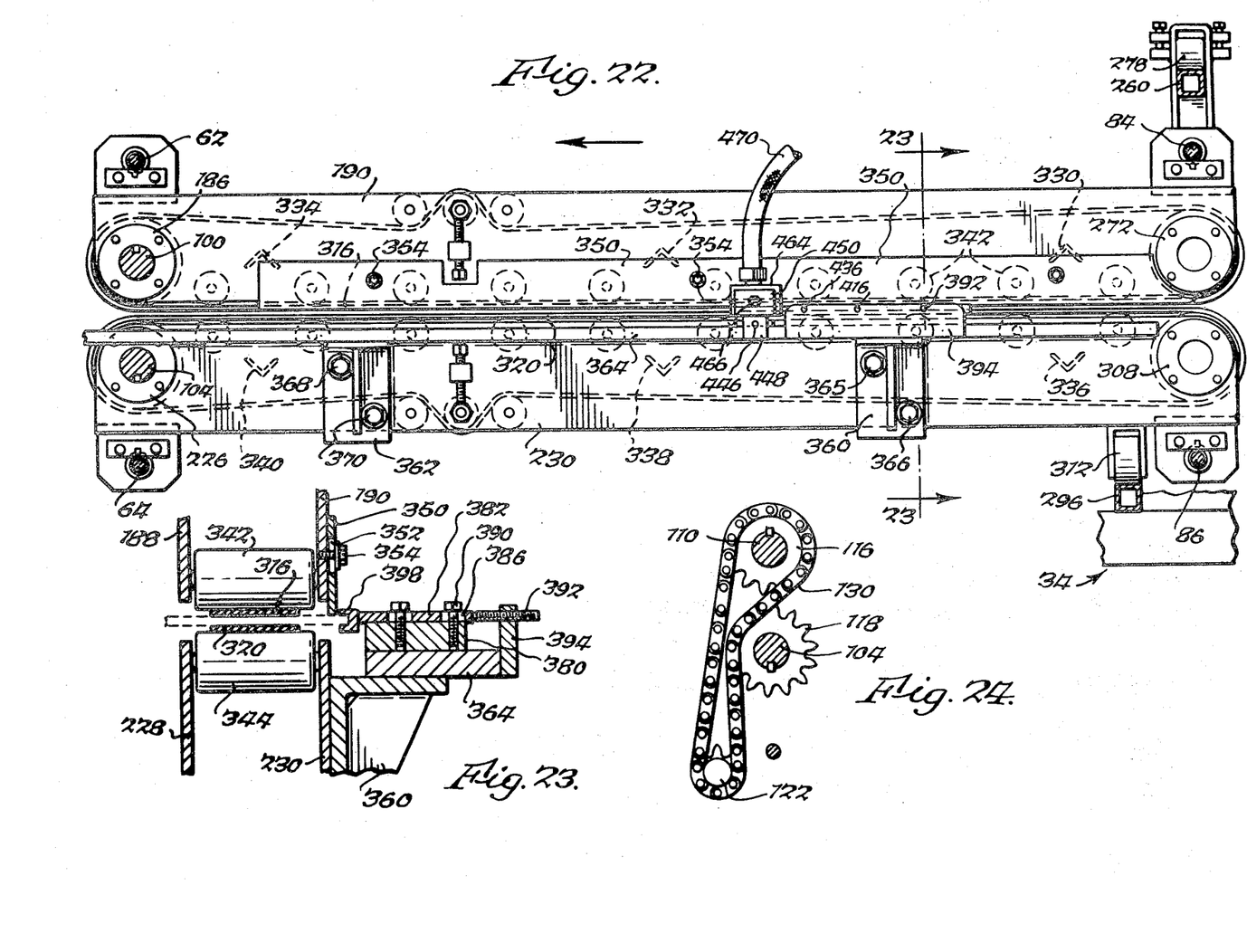
FIG. 22 is a sectional view taken at lines 22—22, FIG. 20.
FIG. 23 is a cross-sectional view taken at lines 23—23, FIG. 22.
FIG. 24 is a sectional view taken at lines 24—24, FIG. 20.

As best shown in FIG. 20, shaft 100, having longitudinally extending keyway 102, and shaft 104, having longitudinally extending keyway 106, are mounted, at their opposite ends, for rotation in bearings 108, 110, 112, 114, fixed to supports 40, 42, respectively. Sprocket 116 is keyed to shaft 102 and sprockets 118 (FIG. 24), 120, are keyed to shaft 104. Idler sprocket 122 is mounted for rotation on bracket 124 fixed to member 126 of frame 34. Referring to FIG. 24, sprockets 116, 118, 122 are interconnected by chain 130. Sprocket 120, FIG. 24, is connected by chain 132 to variable speed drive 134, FIG. 4, driven by motor 136.

Referring to FIG. 20, belt driving rolls 140, 142 are keyed to shaft 100 in longitudinal keyway 102 and belt driving rolls 144, 146 are keyed to shaft 104 by longitudinal keyway 106. Belt driving roll 140 is held in fixed position on shaft 100 by thrust bearings 150, 152, mounted in plates 154, 156, attached by bolts to plates 158, 160. Plates 158, 160 are fastened, as by, for example, welding, to block 161 mounted, by bearings 162, 164, and collars 166, 168, fixed by set screws 170, 172, to shaft 50. Belt driving roll 142 is held in fixed position on shaft 100 by thrust bearings 180, 182, mounted in plates 184, 186 and bolted to plates 188, 190 fastened, respectively, as by, for example, welding, to block 192, threaded by sleeve 194 to threads 62 on shaft 50.

Belt driving roll 144 is held in fixed position on shaft 104 by thrust bearings 200, 202 mounted in plates 204, 206 bolted to plates 208, 210. Plates 208, 210 are fastened, as by, for example, welding, to block 212 mounted in fixed position on shaft 52 by collars 214, 216. Belt driving roll 146 is held in fixed position on shaft 104 by thrust bearings 220, 222 mounted in plates 224, 226, and bolted to plates 228, 230. Plates 228, 230 are fastened, as by, for example, welding, to block 232, threaded to threads 64 on shaft 52.

Referring to FIG. 21, plates 158, 160, 188, 190, 208, 210, 228, 230 (FIGS. 20 and 21) extend longitudinally of frame 34. Belt roll 240 is mounted for rotation on plates 158, 160, by bearings 242, 244, mounted on plates 246, 248, and bolted to plates 158, 160. Plates 158, 160 are fastened as by, for example, welding, to block 250, mounted in fixed position by collars 252, 254 on shaft 72. Extension 256 of block 250 extends over transverse frame member 260 of frame 34 and has adjusting set screw for adjusting the vertical position of block 250 and belt roll 240.

Belt roll 264 is mounted for rotation on plates 188, 190 by bearings 266, 268 mounted on plates 270, 272 bolted to plates 188, 190. Plates 188, 190 are fastened, as by, for example, welding, to block 274 threaded on threads 84 of shaft 72. Roller 278 on extension 276 of block 274 is supported on the upper surface of transverse frame member 260.

Belt roll 280 is mounted for rotation on plates 208, 210 by bearings 282, 284 mounted on plates 286, 288 bolted to plates 208, 310. Plates 208, 210 are fastened, as by, for example, welding, to block 290 mounted in fixed position on shaft 74 by collars 292, 294. Block 290 rests on transverse frame member 296 of frame 34.

Belt roll 300 is mounted for rotation in plates 228, 230 by bearings 302, 304, mounted in plates 306, 308 bolted to plates 228, 230. Plates 228, 230 are fastened, as by, for example, welding, to block 310 threaded onto threads 86 of shaft 74. Roller 312 of block 310 rests on transverse frame member 296. Endless belt 310 extends around belt driving roll 140 (FIG. 20) and belt driving roll 240 (FIG. 21). Belt 316 extends around belt driving roll 142 and belt driving roll 264. Endless belt 318 extends around belt driving roll 144 and belt driving roll 280. Endless belt 320 extends around belt driving roll 146 and belt roll 300. The outer surfaces of endless belts 314, 316, 318, 320 are roughened so that, as a sheet of corrugated core paperboard is fed between the opposing roughened surface of the belt, the opposing roughened belt surfaces engage and feed the board longitudinally between the belts. By rotating shafts 50, 52, 72, 74 with crank 68, and the chain and sprocket associated therewith, the spacing of opposed belt 314, 318, with opposing belts 316, 320, may be adjusted for wider or narrower paperboard sheets.

Referring to FIGS. 22, 23, plates 188, 190 are held in fixed, parallel spaced position by spacers 330, 332, 334.

Plates 228, 230 are held in fixed, parallel spaced position by spacers 336, 338, 340. Rollers 342, mounted at their opposite ends in plates 188, 190, engage belt 316 and rollers 344, mounted at their opposite ends in plates 228, 230 engage belt 320. Rollers 342, 344 hold the respective belts 316, 320 in engagement with the facing sheets of the corrugated core paperboard.

In the illustrated embodiment of the apparatus used to practice the method of the instant invention, the open, or fluted edges of the core of the corrugated paperboard, at the opposite edges of the board, as the board is fed through the apparatus, are passed between horizontally disposed knife blades, positioned at the edge of, and projecting slightly into, the path of the advanced paperboard intermediate the top and bottom sheets so that the knife cuts or slits the end of the corrugated core intermediate the facing sheets. This is accomplished at one edge or at both edges simultaneously by the knife, or knives, located along the edge, or edges, of the paperboard feed path as the board is fed by belts 314, 318 and 316, 320. Such knives, where both edges are to be sealed simultaneously, are mounted on plates 190, 230 and 158, 208 and are movable with such plates and as plates and belts are adjusted with crank 68 to accommodate wider or narrower corrugated paperboards. Because such knife components, die components for rolling the board edges and thermoplastic applicator, where such an applicator is used, at the opposite edges of the boards, are identical, the components attached to plates 190, 230 will be described. It is understood that where both edges are closed or sealed, simultaneously, such components are duplicated on plates 158, 208.

Guide plate 350, having slots 352, is adjustably mounted on plate 190 by bolts 354. The lower edge of guide plate 350 is adjusted, on plate 190, to engage and guide the upper surface of the corrugated core paperboard, as the board is fed through the apparatus. Brackets 360, 362 are mounted on plate 230 by bolts 365, 366, 368, 370, respectively. Plate 364 is fastened to brackets 360, 362 as by, for example, welding.

Figure 6:
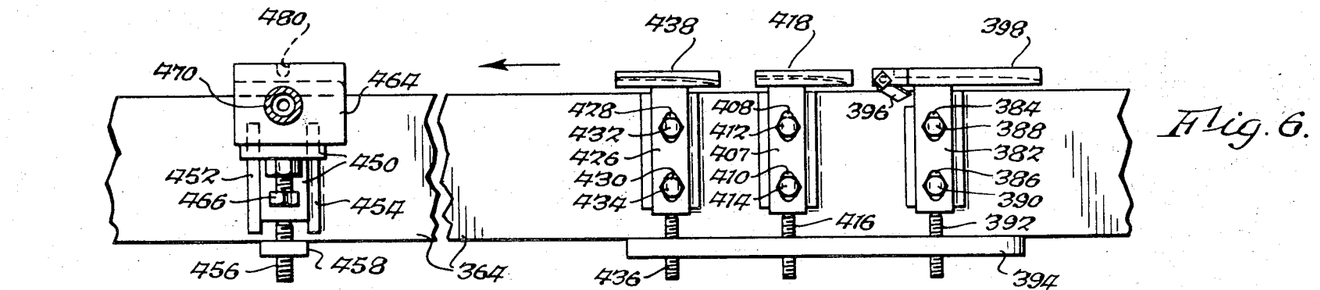
FIG. 6 is an enlarged horizontal view, taken at 6—6, FIG. 4, of the knife guide and sealing applicator of FIG. 4.
Figure 7:
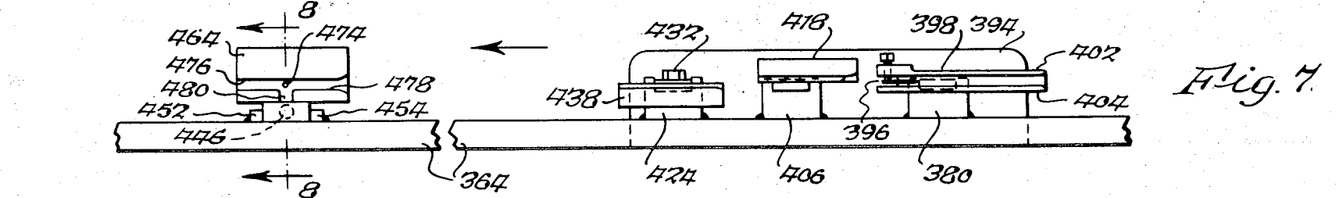
FIG. 7 is a side elevational view of the apparatus of FIG. 6.
Figure 8:
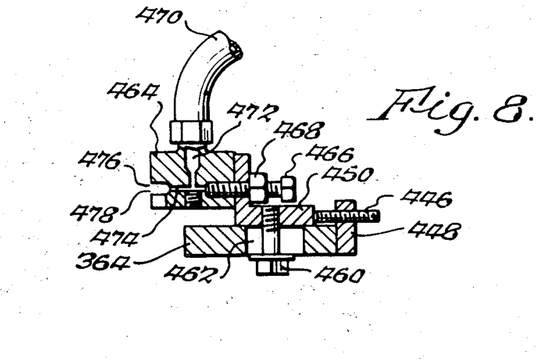
FIG. 8 is a sectional view of the adhesive applicator taken at line 8—8, FIG. 7.

Referring now to FIGS. 6, 7 and 8, knife support block 380 is fastened to plate 364 as by, for example, welding. Knife support 382, having slots 384, 386, is connected, by bolts 388, 390, to block 380 and is adjusted therein by set screw 392 threaded into plate 394 fastened as by, for example, welding, to the outer edge of plate 364. Knife blade 396 is fastened to the end of knife guide 398. Knife guide 398 has an upper wall 402 and a low wall 404 (FIG. 10) between which the edge of the corrugated core board passes into engagement with knife 396 as such board is fed through the apparatus, as hereinafter more fully described.

Figures 9, 10, 11, 12, 13, 14, 15, 16, 17, 18, 19:
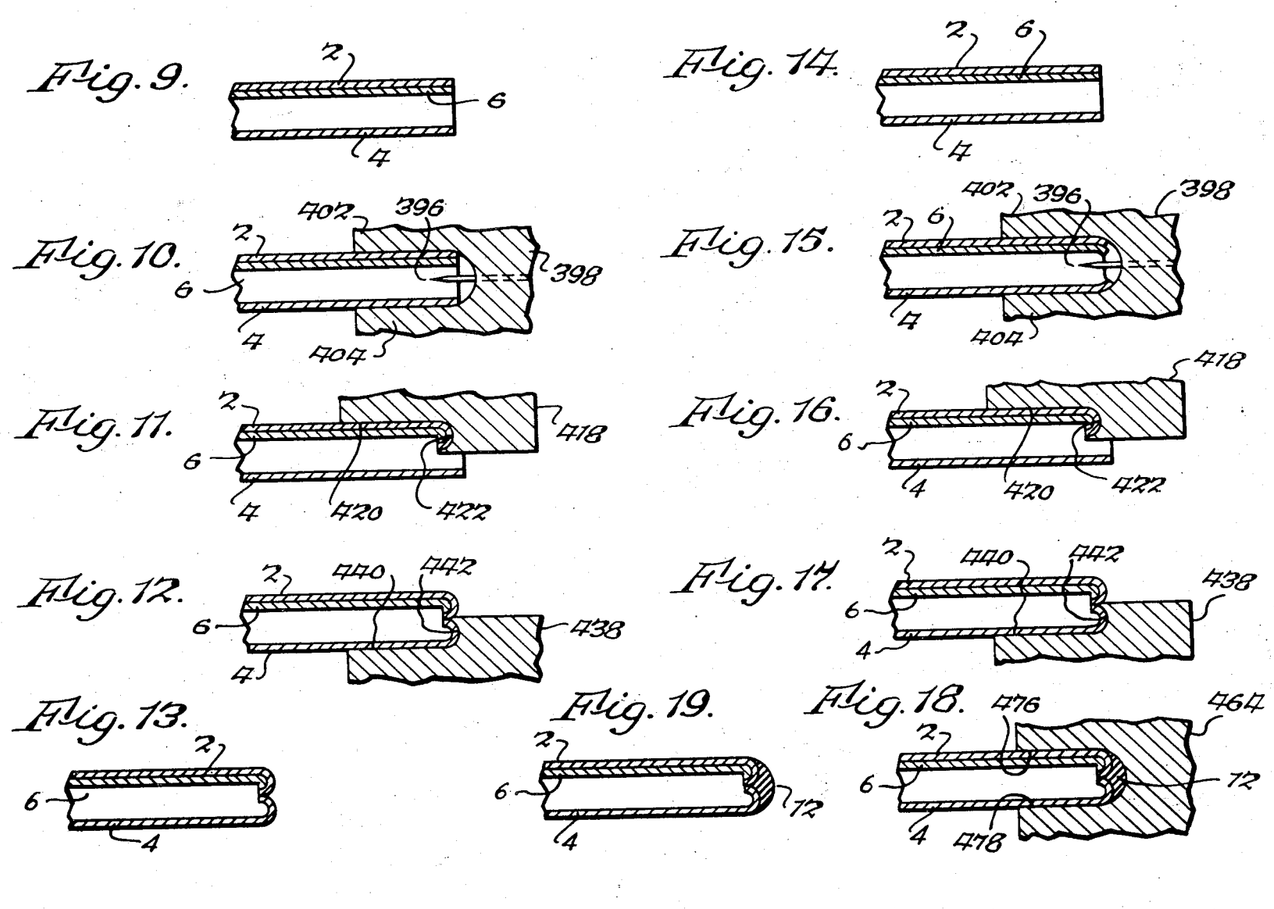
FIGS. 9, 10, 11, 12 and 13 are various cross-sectional views taken of the corrugated paperboard edge forming apparatus and paperboard at various stages of the edge closing, commencing at FIG. 9 with the open edge corrugated paperboard and ending at FIG. 13 with the facing sheets rolled and tucked and showing in the intermediate figures various steps in the cutting or crushing of the corrugated core and rolling of the paperboard edges.
FIGS. 14 to 19 are views similar to FIGS. 9 to 13 but, in FIGS. 18 and 19, showing the adhesive bead along the folded edges of the facing sheets.

Upper facing sheet guide block 406 is fastened as by, for example, welding, to plate 364. Upper facing sheet guide support 407, having slots 408, 410, is connected by bolts 412, 414 to block 406 and is adjusted therein by set screw 416, threaded into plate 394. Upper facing sheet guide 418 is fastened to the end of guide support 407. Upper facing sheet guide 418 has an upper surface 420 for engagement with the surface of the upper facing sheet and an arcuate surface 422 extending outwardly from and curving inwardly toward and spaced parallel from surface 420 (FIG. 11).

Lower facing sheet guide block 424 is fastened as by, for example, welding to plate 364. Lower facing sheet guide support 426, having slots 428, 430, is connected by bolts 432, 434, to block 424 and is adjustable therein by set screw 436 threaded into plate 394. Lower facing sheet guide 438 is fastened to the end guide support 426. Surface 440 of guide 438 engages the surface of the lower facing sheet. Arcuate surface 442 curves away from and toward and in spaced parallel relationship to surface 440 (FIG. 12).

As best shown in FIG. 8, adhesive applicator guide block 450 is adjustably mounted between guides 452, 454 (FIGS. 6 and 7) fastened, as by, for example, welding to plate 364, by set screw 456 threaded into plate 458 fastened, as by, for example, welding to plate 364. Applicator guide block 450 is locked in position on plate 364, bolt 460 in slot 462 in plate 364. Applicator 464 is attached to guide block 450 by bolt 466 locked in position by locking nut 468. Conduit 470 for supplying thermoplastic material to the applicator is connected to applicator 464 in communication with passages 472, 474 in applicator 464. Applicator 464 has a channel facing inwardly toward the corrugated paperboard path, such channel having an upper wall 476, a lower wall 478 and a vertical drain 480 (FIGS. 6 and 7) for draining excess thermoplastic material from the channel for reasons more apparent hereinafter.

In the operation of the apparatus used to practice the method of the instant invention, corrugated paperboard, with its edge or edges to be closed, trimmed so that the edges are substantially square, is fed through the apparatus in the direction of the arrows (FIGS. 4, 5, 6, 7 and 22). The paperboard is fed to the apparatus with the corrugations of the paperboard transverse to the direction of travel of the paperboard through the apparatus. The paperboard may be fed from a supply roll or may first be cut into sheets and the sheets may be fed, one after the other, through the apparatus. Before the feed of the board commences, the width of the machine between feed belts 314, 318 and 316, 320 and the knife forming dies and thermoplastic applicator, if the thermoplastic applicator is used, is adjusted to the board width by turning crank 68 and by adjusting and locking the knife, die and applicator assemblies on plate 364. Guides 24, 26 on table 20 are adjusted to guide a corrugated board into the apparatus.

With motor 136 running and through variable speed drive 134 driving belts 314, 318, 316, 320, the belts feed the corrugated paperboard through the machine. Plates 350 are adjusted so that the upper facing sheet surface of the paperboard slides along the bottom surface of the plates.

The edge of the corrugated paperboard, as such paperboard is fed through the apparatus, enters knife guide 398 between walls 402, 404 (FIGS. 6, 7, 10 and 15) and into engagement with knife 396. As best shown in FIGS. 10 and 15, knife 396 slits the center core 6 of the paperboard. After passing knife 396, the upper facing sheet 2 engages upper wall 420 of upper facing sheet guide 418 and arcuate surface 422 (FIGS. 11 and 16), arcuate surface 422 rolling the edge of facing sheet 2 into the slit in core 6 cut by knife 396. Next, the lower facing sheet 4 engages wall 440 of guide 438, the arcuate surface 442 rolling the edge of facing sheet 4 into the slit in core 6 cut by knife 396. Thus, as the paperboard is fed out of guide 438, the edges of the upper and lower facing sheets are rolled into the slit in core 6.

For many uses, the rolling and positioning of the ends of the facing sheets in the slit in core 6 provides a sufficient seal over the open, fluted edge of the corrugations of the corrugated core to prevent the entry of dirt, foreign matter and liquid into the core. Hence, without application of a thermoplastic material to the edge, the edge is sealed. However, if a further seal of thermoplastic material is desired, the edge of the board, with the facing sheet edges rolled and tucked into the slit, may be fed through applicator 464 between walls 476, 478 and a bead of thermoplastic material may be deposited, as a film, between the rolled edges of the paperboard facing sheets where the edges are tucked into core 6. The feed of thermoplastic material through conduit 470 and passages 472, 474 is adjusted so that, at the open end of passage 474, a constant supply of thermoplastic material is maintained as the edge of he corrugated paperboard passes through the applicator. This is important because, if too little material is supplied, the required seal will not be formed. If, on the other hand, excess material is supplied, such excess material, over and above that deposited on the board edge, will drain off through drain 480.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. A method for forming an enclosure along the convolution core openings between the facing sheets of a corrugated paperboard, the steps comprising feeding said board along a path with the convolution openings of said core at at least one edge of said board in alignment with said path, while feeding said one edge along said path, cutting the end of said core at said convolution openings intermediate said facing sheets to form a slit in said core; and, after said core is slit, rolling the edges of said facing sheets inwardly toward each other and tucking the ends of said rolled edges of said facing sheets into said slit in said core with the outer surfaces of said facing sheets in contact with each other.

2. A method, as recited in claim 1, including the further step of applying a bead of thermoplastic material between the rolled edges of said facing sheets where the surfaces of said facing sheets are in contact with each other.

References Cited

UNITED STATES PATENTS

| | | | |
|---|---|---|---|
| 3,579,396 | 5/1971 | Washburn et al. | 156—202 |
| 3,563,843 | 2/1971 | Wagers et al. | 161—149 X |
| 1,584,148 | 5/1926 | Schumacher | 161—149 X |
| 1,678,959 | 7/1928 | Schumacher | 161—149 X |
| 1,650,930 | 11/1927 | Birdsey | 161—104 X |
| 1,358,508 | 11/1920 | Birdsey | 161—149 X |

PHILIP DIER, Primary Examiner

U.S. Cl. X.R.

156—254, 257, 443; 161—104, 149; 229—5.5, 31

UNITED STATES PATENT OFFICE
CERTIFICATE OF CORRECTION

Patent No. 3,788,920           Dated January 29, 1974

Inventor(s) R. H. Frappier et al

It is certified that error appears in the above-identified patent and that said Letters Patent are hereby corrected as shown below:

Col. 1, line 22, change the comma to a period and delete the remainder of the paragraph.

Col. 2, line 6, after "sheets" insert --and rolling the edge of the facing sheets--.

Col. 3, line 57, "doublt" should be --double--.

Col. 4, line 49, "310" should be --210--.
         line 58, "310" should be -- 314 -- .

Col. 5, line 48, "low" should be --lower--.

Col. 6, line 24, after "fed" insert --as a continuous strip from the end of a corrugated machine producing such board, may be fed--.
         line 72, "he" should be --the--.

Signed and sealed this 20th day of August 1974.

(SEAL)
Attest:

McCOY M. GIBSON, JR.
Attesting Officer

C. MARSHALL DANN
Commissioner of Patents